Patented Sept. 8, 1942

2,294,955

UNITED STATES PATENT OFFICE 2,294,955

PROCESS FOR THE MANUFACTURE OF UNSATURATED ALDEHYDES

Joseph H. Brant, Kingsport, Tenn., assignor to Eastman Kodak Company, Rochester, N. Y., a corporation of New Jersey No Drawing. Application August 11, 1938, Serial No. 224,358

7 Claims. (Cl. 260—601)

This invention relates to the manufacture of unsaturated aliphatic aldehydes and more particularly to a process for the manufacture of acrolein. This invention is also concerned with the manufacture of substituted unsaturated aldehyde such as, for example, α-ethacrolein and the hydrogenation products of both the aforementioned simple and substituted unsaturated aldehydes as well as other derivatives thereof.

The unsaturated aliphatic aldehydes are characterized by including a double bond in their carbon atom chain. The unsaturated aldehyde, acrolein, also referred to as acrylic aldehyde, with which this invention is particularly concerned, has the formula:

$$CH_2=CH.CHO.$$

This application is an improvement invention over that shown in allowed Gallagher and Hasche application Serial No. 88,821, filed July 3, 1936.

As pointed out in the aforementioned application, unsaturated aliphatic aldehydes and, in particular, acrolein, have a number of uses. These organic compounds may be converted to other chemical products. For example, acrolein may be converted to propionic aldehyde in accordance with the procedure set forth in Gallagher and Hasche copending application Serial No. 88,822, entitled "Improved Method for the manufacture of propionic aldehyde," now Patent No. 2,150,158. Also, acrolein may serve as a source of propionic aldehyde for the production of propionic acid and employ the oxidation procedure described in Hasche copending application No. 34,215 of August 1, 1935.

Liquid phase processes, known as "aldol condensation" have been carried out in the prior art, wherein a single aldehyde combines with itself. However, prior to Gallagher and Hasche's invention, few, if any, methods have been developed for the direct manufacture of the unsaturated aldehydes and in particular unsaturated aldehydes containing an odd number of carbon atoms, with which the present invention is concerned.

I have found an improved method and catalyst for the manufacture of unsaturated aliphatic aldehydes, and in particular unsaturated aldehydes containing an odd number of carbon atoms in the molecule, such as acrolein.

I have found that two different aldehydes may be caused to readily combine to produce an unsaturated aldehyde containing a number of carbon atoms equal to the sum of two aldehyde reactants by carrying out the reaction under the conditions herein described.

This invention has for an object to provide a particularly effective process for the combination of two different aliphatic aldehydes to produce an unsaturated aliphatic aldehyde in relatively high yields. Another object is to provide a process for the production of unsaturated aliphatic aldehydes containing an odd number of carbon atoms in the molecule. A further object is to improve and expedite the reaction of two different aldehydes in the vapor phase.

A further object is to provide catalytic procedure particularly adapted for the reaction of the one carbon aldehyde, formaldehyde, with another aldehyde. Another object is to provide catalytic procedure particularly adapted for reacting formaldehyde (formalin) or other source thereof, with one or more aldehydes such as acetaldehyde, propionaldehyde and butyraldehyde. Still another object is to provide a catalyst particularly adapted for the production of unsaturated aliphatic aldehydes. A still further object is to provide a novel catalyst and process particularly adapted for the production of unsaturated aliphatic aldehyde such as acrolein, α-methacrolein, α-ethacrolein and the like.

Still another object is to provide novel catalysts and catalyst supports particularly adapted for use in processes involving the reaction of aldehydes containing a different number of carbon atoms in the molecule.

Other objects will appear hereinafter.

I have found that highly desirable results may be obtained by catalytically reacting formaldehyde and acetaldehyde (or other aldehyde) in the presence of a catalyst containing lead and otherwise in accordance with the procedure set forth herein.

My process may be carried out in any suitable apparatus, as for example, the apparatus shown in Gallagher and Hasche Patent No. 2,150,158. A suitable apparatus would comprise two containers, namely, separate containers for each of the different aldehydes to be reacted. Conduits would lead from these containers to vaporizing or mixing equipment which is in turn connected with a catalyst chamber. The catalyst chamber could be heated in a conventional manner electrically, or by gas flame or other procedure. The catalyst chamber would be connected with condensers, hydrogenation equipment, distillation units or other type apparatus.

The catalyst chamber would be filled with my novel catalyst, which I have found to be particularly adapted for the reaction described herein. I have found that salts of lead, either supported on a carrier or impregnated in a support or otherwise positioned in the catalyst chamber, are particularly effective materials for expediting the reaction of two different aldehydes in accordance with the present invention. Lead acetate and lead chromate are specific examples of lead salts which have proven to be quite satisfactory. Preferably, the lead salts would be in combination with a silica gel, alumina gel, or the like, although other suitable materials might be employed, such as activated carbon, magnesium oxide, or the like. An amount of lead salts usually around 10% of the total catalyst (catalyst plus catalyst support) is sufficient. However, other amounts from ½% up to 35% or 40% could be employed, but do not represent, my preferred embodiment.

The catalyst may be made by the following procedure. Approximately 100 g. of silica gel, alumina gel, or other material to comprise part of the catalyst was placed in a container. To this material was added an acid solution prepared by incorporating approximately 10 g. of a lead compound such as litharge (PbO) in an aqueous acetic acid solution comprising approximately one part by volume acetic acid to 2–3 parts by volume of water. The excess liquid may be removed by heating together, if desired, with the application of reduced pressure.

The silica gel, alumina gel or other material containing lead salts prepared in accordance with the preceding paragraph was then treated with a mixture of aqueous sulphuric acid (10 g. of sulphuric acid diluted to 30 cc. with water). By this procedure the lead acetate were completely converted to the corresponding sulphates, being precipitated on or within the pores of the supporting material.

As an alternative procedure, the silica gel, alumina gel or other material may be first treated with aqueous sulphuric acid. To this sulphuric acid treated material may then be added the aqueous acetic acid solution resulting from dissolving the lead salt in the acetic acid. A satisfactory catalyst is likewise produced by this procedure.

I have also found that an excellent catalyst is a mixture of 75% by weight of lead chromate and 25% of powdered silica gel, pressing the mixture into cakes or pellets.

Similar procedure may be followed for preparing catalysts of other lead salts.

A vaporous mixture of formaldehyde with acetaldehyde was obtained and this mixture passed in catalytic contact through a catalyst chamber charged with my novel lead catalyst. The temperature of the catalyst chamber and reaction was maintained at greater than 220° C. and preferably during the greater part of the run at around 290–320° C. High yields of the unsaturated aldehyde, acrolein, were obtained in the products issuing from the catalyst chamber.

Similar runs were conducted with vaporous mixtures comprising formaldehyde and other aliphatic aldehydes such as propionic aldehyde and butyraldehyde. High yields of the corresponding α-substituted unsaturated aldehydes were obtained.

For a more complete understanding of my invention, further reference is made to the following examples which are set forth in tabular form:

| Run No. | Temp. range °C. | Feed ratio CHO/AcH | G. acrolein per 100 cc. condensate | Space velocity | Percent CH₂O converted | Catalyst sup. | Data cat. |
|---|---|---|---|---|---|---|---|
| 2-153 | 310 | 0.28 | 15.2 | 1,220 | 69.5 | Silica gel | 10% Pb (OAc)₂ |
| 6-94 | 292 | 0.25 | 15.9 | 514 | 73.5 | do | Do. |
| 6-116 | 282 | 0.21 | 11.9 | 494 | 57.2 | do | 10% PbSO₄ |
| 6-119 | 290 | 0.21 | 8.42 | 1,278 | 42.7 | Al₂O₃ | 10% Pb (OAc)₂ |
| 6-131 | 292 | 0.25 | 10.8 | 1,290 | 46.3 | do | 10% Pb SO₄ |
| 6-133 | 284 | 0.25 | 18.2 | 865 | 82.3 | Silica gel | 10% Pb (OAc)₂ |
| 6-158 | 295 | 0.25 | 17.1 | 1,121 | 82.2 | do | Do. |
| 171A | 297 | 0.303 | 13.5 | 1,125 | 64.0 | do | 10% Pb (NO₃)₂ |
| 6-178 | 295 | 0.25 | 11.7 | 1,231 | 53.0 | Decalso | 10% Pb (OAc)₂ |
| 6-193 | 300 | 0.25 | 12.9 | 1,242 | 58.4 | Super Z. D. | Do. |
| 6-242 | 300 | 0.25 | 12.6 | 1,212 | 61.6 | Al₂O₃ | 10% Pb CrO₄ |
| 5-9 | 300 | 0.45 | 16.35 | 945 | 46.5 | Silica gel | 5% Pb. |
| 5-13 | 300 | 0.45 | 16.6 | 945 | 49.0 | do | Do. |
| 3-114 | 305 | 0.45 | 17.2 | 955 | 50.0 | do | 5% Pb (OAc)₂ |
| 5-47 | 295 | 0.45 | 17.3 | 935 | 48.5 | do | 2.5% Pb (OAc)₂ |

In the preceding tables the materials Zeodur, Super Zeodur, and Decalso are commercially available substances having compositions somewhat as follows:

|  | Zeodur | Super Zeodur |
|---|---|---|
|  | Percent |  |
| $SiO_2$ | 50.74 | 45.8 |
| $Fe_2O_3$ | 17.36 | 25.05 |
| $K_2O$ | 6.68 | 6.68 |
| $Al_2O_3$ | 1.93 | 1.93 |
| $MgO$ | 3.76 |  |
| $FeO$ | 3.34 |  |
| $CaO$ | 2.86 |  |
| $Na_2O$ | 1.53 | 7.65 |
| $CO_2$ | 0.88 |  |
| $P_2O_5$ | 1.79 | 1.79 |
| $H_2O$ | 9.08 | 11.1 |

Decalso:
$1.1\ Na_2O.Al_2O_3.6SiO_2.6H_2O$

In my process it is possible to use acetaldehyde from various sources. For example, the acetaldehyde may be obtained synthetically from acetylene. The acetylene may be produced from calcium carbide, cracking hydrocarbons or the decomposition of hydrocarbons in an electric arc. The acetaldehyde may also be obtained from ethyl alcohol.

Likewise, various sources of formaldehyde may be employed. Since relatively pure formaldehyde boils at approximately −21° C., formalin, which contains around 40% of formaldehyde, the remainder being principally methyl alcohol and water, is an easier source of formaldehyde to work with. The methyl alcohol content of the formalin does not interfere with the process. Solid para-formaldehyde may be employed.

The above examples are merely illustrations of conditions for carrying out my process. The reaction conditions may be varied and the above examples are not to be construed as limiting my invention. For example, the mole ratio of acetaldehyde to formaldehyde, while generally kept within the range of from 5–0.5, may be varied outside of these limits. The high ratio is desirable because the yield based on formaldehyde is smaller than the yield based on acetaldehyde, and I have found that a more complete utilization of the formaldehyde could be obtained by using a higher formaldehyde to acetaldehyde ratio.

The space velocities for the formation of acrolein may vary according to conditions and reaction equipment. I have found a range from 200–3000 to be suitable for carrying out my reaction. I may define "space velocity" as cubic feet of reactants fed per cubic foot catalyst per hour—volumes of reactant materials measured at temperatures and pressures of reaction. As already indicated, the temperature range may vary from about 200° C. to 400° C. While we prefer to carry out the reaction under atmospheric conditions, it is possible to carry out the reaction under either higher or lower pressures.

While my process is particularly adapted for the preparation of unsaturated aliphatic aldehydes as described in the above examples, my invention has wider applications and embraces similar procedure for the formation of other mixed products. An example of the formation of an unsaturated aldehyde with an even number of carbon atoms is the reaction between formaldehyde and propionaldehyde to form a methacrylic-aldehyde.

It will be observed that by my process of reacting with formaldehyde, aldehydes of higher molecular weight than acetaldehyde, there may be obtained an alkyl group in the alpha position. Such α-substituted type of compound has value in synthetic resin production and other similar uses. For a further example, formaldehyde combines with normal butyraldehyde to form α-ethacrolein in accordance with the following equation:

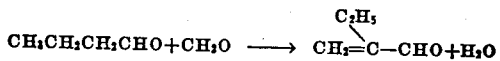

Thus I have discovered a process which will form any of the substituted acroleins in which I may be interested.

This reaction of formaldehyde with other aldehydes higher than acetaldehyde goes with greater ease and with higher yields than produced in the manufacture of acrolein by the afore-described reaction of formaldehyde with acetaldehyde. The catalyst does not become foul or lose its activity to any great degree even with extensive use in these processes for reacting formaldehyde with 3-carbon atom, 4-carbon atom or higher aldehydes.

My process does not require the utilization of high pressures which is believed to be unusual for a process of this type. My process is also particularly desirable from the standpoint that any by-products produced are few in number and in relatively small quantities when my process is properly employed. Any unreacted components may be reutilized by circulation through the system.

It is therefore apparent that while I have described my invention in some detail, there are many changes that may be made therein without departing from the spirit of the invention.

What I claim as my invention and desire to secure by Letters Patent of the United States of America is:

1. In a process for producing unsaturated aliphatic aldehydes, the step which comprises reacting materials containing formaldehyde with another aliphatic aldehyde, in the presence of a lead acetate catalyst maintained at a temperature greater than 200° C. and less than 400° C.

2. The chemical process which comprises reacting formaldehyde and another aliphatic aldehyde in the vapor phase and in the presence of a lead chromate catalyst maintained at a temperature between 250° C. and 400° C.

3. A process for producing higher aliphatic aldehydes, which comprises reacting a mixture containing at least two different aliphatic aldehydes in the vapor phase and in contact with a catalyst comprising a gel catalyst support and lead chromate, said catalyst being maintained at a temperature at least part of the time, whereby the reaction will take place under vapor phase conditions.

4. The process which comprises reacting at least two different aldehydes in the vapor phase and in contact with a catalyst essentially comprising a support and 2.5% to 15% of a lead compound from the group consisting of lead acetate, lead sulphate, lead nitrate, lead chromate, and lead oxide, maintained at a temperature at least part of the time whereby the reaction will take place under vapor phase conditions.

5. The process for reacting formaldehyde with another carbonyl compound having not more than 4 carbon atoms in the molecule, which comprises passing the aforementioned reactants in the vapor phase and at a space velocity within the range of from 200 to 3000, into contact with a catalyst comprising a support and 5% to 15% of a compound from the group consisting of lead acetate, lead sulphate, lead nitrate, lead chromate, and lead oxide, such reaction being carried out at a temperature between 220° C. and 400° C.

6. The process for reacting formaldehyde with another carbonyl compound having not more than 4 carbon atoms in the molecule, which comprises passing the aforementioned reactants in the vapor phase and at a space velocity within the range of from 200 to 3000, into contact with a catalyst essentially comprising a content of at least one of the lead compounds from the group consisting of lead acetate, lead sulphate, lead nitrate, lead chromate, and lead oxide, such reaction being carried out at a temperature between 220° C. and 400° C.

7. The process which comprises reacting formaldehyde with another carbonyl compound having not more than 4 carbon atoms in the molecule, in the vapor phase and in contact with a catalyst essentially comprising a support and a lead compound from the group consisting of lead acetate, lead sulphate, lead nitrate, and lead oxide, said reaction being carried out at a temperature between 220° C. and 400° C.

JOSEPH H. BRANT.